United States Patent
Reitz et al.

(10) Patent No.: US 6,344,020 B1
(45) Date of Patent: Feb. 5, 2002

(54) BEARING AND UMBILICUS GIMBAL WITH BEARING RETAINER IN BLOOD PROCESSING SYSTEM

(75) Inventors: Douglas Reitz; Ying-Cheng Lo, both of Green Oaks; John Joseph Belle, Wheaton; Richard West, Lake Villa; Timothy Patno, Evanston, all of IL (US)

(73) Assignee: Baxter International Inc., Deerfield, IL (US)

( * ) Notice: Subject to any disclaimer, the term of this patent is extended or adjusted under 35 U.S.C. 154(b) by 0 days.

(21) Appl. No.: 09/455,203

(22) Filed: Dec. 6, 1999

Related U.S. Application Data

(63) Continuation-in-part of application No. 09/334,340, filed on Jun. 16, 1999, now abandoned, which is a continuation-in-part of application No. 08/835,928, filed on Apr. 11, 1997, now Pat. No. 5,989,177.

(51) Int. Cl.$^7$ .............................. B04B 7/00; F16C 33/00; F16C 33/38; F16D 3/00
(52) U.S. Cl. ............................. 494/46; 494/18; 494/83; 384/523; 384/526; 384/527; 464/106; 464/178
(58) Field of Search .............................. 494/16, 17, 18, 494/20, 21, 19, 43, 45, 46, 83; 384/523, 527, 572, 576, 908, 911, 526; 464/106, 178

(56) References Cited

U.S. PATENT DOCUMENTS

| | | | |
|---|---|---|---|
| 2,983,639 A | 5/1961 | Jageman |
| 3,678,964 A | 7/1972 | Andrews |
| 3,861,972 A | 1/1975 | Glover et al. |
| 3,986,442 A | 10/1976 | Khoja |
| 4,056,224 A | 11/1977 | Lolachi |
| 4,108,353 A | 8/1978 | Brown |

(List continued on next page.)

*Primary Examiner*—John Kim
(74) *Attorney, Agent, or Firm*—Daniel D. Ryan; Michael C. Mayo; Bradford R. L. Price

(57) ABSTRACT

A bearing supports a rotating element. The bearing comprises an inner annular body and an outer annular body about the inner annular body. A bearing surface, which is located between the inner annular body and the outer annular body, supports the outer annular body for rotation about the inner annular body. A cage supports the bearing surface during rotation of the outer annular body about the inner annular body. The cage includes a material that imparts increased flexural modulus that resists deformation during rotation.

24 Claims, 7 Drawing Sheets

U.S. PATENT DOCUMENTS

| | | |
|---|---|---|
| 4,109,852 A | 8/1978 | Brown |
| 4,109,854 A | 8/1978 | Brown |
| 4,109,855 A | 8/1978 | Brown |
| 4,113,173 A | 9/1978 | Lolachi |
| 4,114,802 A | 9/1978 | Brown |
| 4,120,449 A | 10/1978 | Brown et al. |
| 4,164,318 A | 8/1979 | Boggs |
| 4,194,684 A | 3/1980 | Boggs |
| 4,221,322 A | 9/1980 | Drago et al. |
| 4,230,263 A | 10/1980 | Westberg |
| 4,245,383 A | 1/1981 | Boggs |
| 4,261,507 A | 4/1981 | Baumler |
| 4,344,560 A | 8/1982 | Iriguchi et al. |
| 4,372,484 A | 2/1983 | Larsson |
| 4,389,206 A | 6/1983 | Bacehowski et al. |
| 4,425,112 A | 1/1984 | Ito |
| 4,439,178 A | 3/1984 | Muzlet |
| 4,440,195 A | 4/1984 | Van Dongeren |
| 4,459,169 A | 7/1984 | Bacehowski |
| 4,517,404 A | 5/1985 | Hughes et al. |
| 4,522,188 A | 6/1985 | Houghton et al. |
| 4,540,397 A | 9/1985 | Lolachi et al. |
| 4,636,346 A | 1/1987 | Gold et al. |
| 4,710,161 A | 12/1987 | Takabayashi |
| 4,778,444 A | 10/1988 | Westberg et al. |
| 4,865,081 A | 9/1989 | Neumann |
| 4,950,401 A | 8/1990 | Unger et al. |
| 5,097,870 A | 3/1992 | Williams |
| 5,118,207 A * | 6/1992 | Ikejiri et al. ................. 384/527 |
| 5,160,310 A | 11/1992 | Yhland |
| 5,305,799 A | 4/1994 | Dal Palu |
| 5,362,291 A | 11/1994 | Williamson, IV |
| 5,514,069 A | 5/1996 | Brown et al. |
| 5,551,942 A | 9/1996 | Brown et al. |
| 5,558,448 A * | 9/1996 | Yabe et al. ................. 384/470 |
| 5,575,570 A * | 11/1996 | Uchiyama et al. .......... 384/470 |

\* cited by examiner

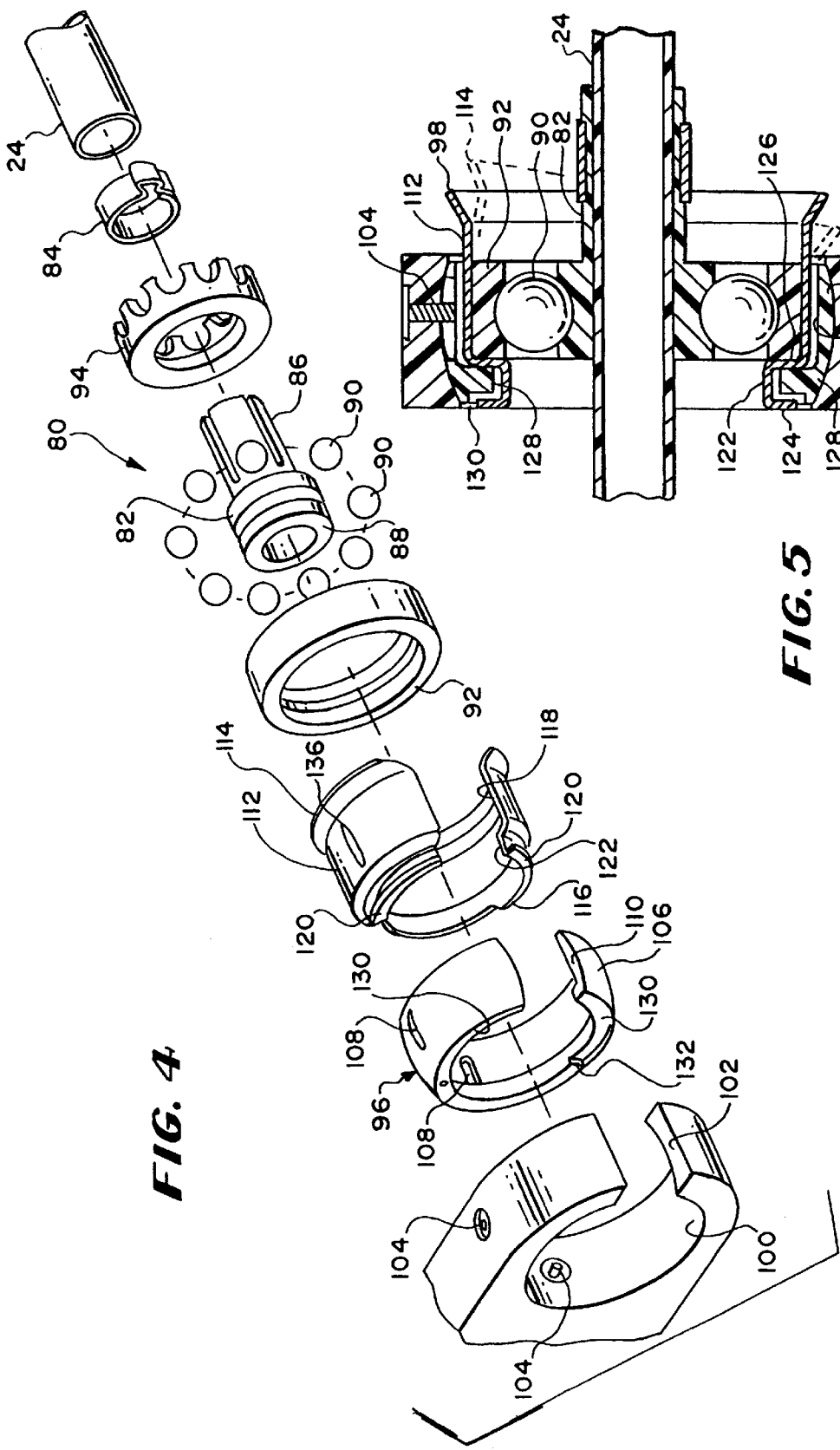
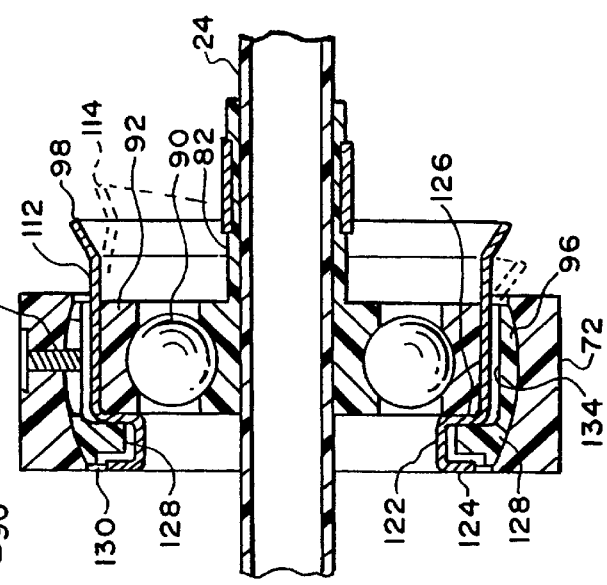
FIG. 4
FIG. 5

BEARING AND UMBILICUS GIMBAL WITH BEARING RETAINER IN BLOOD PROCESSING SYSTEM

RELATED APPLICATION

This application is a continuation-in-part of U.S. patent application Ser. No. 09/334,340, filed Jun. 16, 1999, abandoned, and entitled "Umbilicus Gimbal with Bearing Retainer," which is a continuation of U.S. patent application Ser. No. 08/835,928, filed Apr. 11, 1997 (now U.S. Pat. No. 5,989,177).

FIELD OF THE INVENTION

The invention relates generally to bearings that provide support to a flexible fluid-carrying umbilicus when coupled for use to a rotating fluid processing chamber. The invention also relates generally to centrifugal blood processing systems and apparatus that impart a twisting motion to an umbilicus to rotate a blood processing chamber.

BACKGROUND OF THE INVENTION

Various blood processing systems now make it possible to collect particular blood constituents, rather than whole blood, from donors. Typically, in such systems, whole blood is drawn from a donor, the particular blood component or constituent is removed and collected, and the remaining blood constituents are returned to the donor. By thus removing only particular constituents, less time is needed for the donor's body to return to normal, and donations can be made at more frequent intervals than when whole blood is collected. This increases the overall supply of blood constituents, such as plasma and platelets, made available for health care.

Whole blood is typically separated into its constituents through centrifugation. This requires that the whole blood be passed through a centrifuge after it is withdrawn from, and before it is returned to, the donor. To avoid contamination and possible infection of the donor, the blood is preferably contained within a sealed, sterile system during the entire centrifugation process. Typical blood processing systems thus include a permanent, reusable centrifuge assembly containing the hardware that spins and pumps the blood, and a disposable, sealed and sterile fluid processing assembly that actually makes contact with the donor's blood. The centrifuge assembly engages and spins the fluid processing assembly during a collection procedure. The blood, however, makes actual contact only with the fluid processing assembly, which is used only once and then discarded.

To avoid the need for rotating seals, and to preserve the sterile and sealed integrity of the fluid processing assembly, blood processing systems often utilize centrifuges that operate on the "one-omega, two-omega" operating principle. This principle, which is disclosed in detail in Brown et al., U.S. Pat. No. 4,120,449, enables centrifuges to spin a closed system without the need for rotating seals and without twisting the components of the system. Blood processing systems that make use of the principle typically include a fluid processing assembly that includes a plastic bag that is spun in the centrifuge and that is connected to the blood donor through an umbilicus. The umbilicus is turned back on itself in the form of an inverted question mark, so that an end portion of the umbilicus is coaxially aligned with the axis of rotation of the bag. The intermediate portion of the umbilicus is twisted as the bag is spun to counteract the twisting that would otherwise take place as the bag is spun. The effect is that the end of the umbilicus, which is opposite the bag and is connected to the donor, does not twist as the bag is spun. The sealed, sterile integrity of the fluid processing assembly is thus maintained without the need for rotating seals.

U.S. Pat. No. 5,551,942 to Brown et al., commonly owned by the assignee hereof, discloses one such blood processing apparatus based on the "one-omega, two-omega" operating principle. In this apparatus, a disposable fluid processing assembly having an umbilicus and a processing chamber is mountable within a centrifuge assembly. One end of the umbilicus is held rotationally stationary substantially over the axis of centrifugation. The other end of the umbilicus joins the processing chamber and rotates with the processing chamber around the axis of centrifugation at the two-omega speed. The mid-portion of the umbilicus is supported by a wing plate that rotates around the axis of centrifugation at the one-omega speed. A bearing mounted on the umbilicus permits the umbilicus to rotate relative to the wing plate as the wing plate and the processing chamber turn at different speeds. The bearing slides into a one piece gimbal mounted in a recess provided on the wing plate. The gimbal helps keep the fluid processing assembly properly positioned during the centrifugation procedure. When the procedure is completed, the bearing can be slid out of the gimbal in the wing plate to permit removal of the fluid processing assembly.

SUMMARY OF THE INVENTION

One aspect of the invention provides a bearing for supporting a rotating element. The bearing possesses enhanced flexural modulus, heat resistance and resistance to deformation during use.

In one embodiment, the bearing comprises an inner annular body and an outer annular body about the inner annular body. A bearing surface, which is located between the inner annular body and the outer annular body, supports the outer annular body for rotation about the inner annular body. A cage supports the bearing surface during rotation of the outer annular body about the inner annular body. The cage includes a material that imparts increased flexural modulus that resists deformation during rotation.

Another aspect of the invention provides an umbilicus for use in association with a fluid processing system. The umbilicus comprises an umbilicus body, which carries the bearing.

Another aspect of the invention provides a fluid processing system, e.g., for blood, which includes a fluid processing chamber that, in use, rotates about an axis. An umbilicus carrying the bearing is coupled to the fluid processing chamber by a bearing support. The bearing support is rotated to impart a twisting motion to the umbilicus, to thereby rotate the fluid processing chamber about an axis.

Features and advantages of the invention are set forth in the following Description and Drawings, as well as in the appended claims.

BRIEF DESCRIPTION OF THE DRAWINGS

FIG. 4 is an exploded perspective view of an umbilicus bearing and an umbilicus gimbal and bearing retainer included in the blood processing apparatus and embodying various features of the invention;

FIG. 5 is a cross-sectional view of the umbilicus gimbal and bearing retainer shown in FIG. 4.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DESCRIPTION OF THE PREFERRED EMBODIMENT

Figure 1:
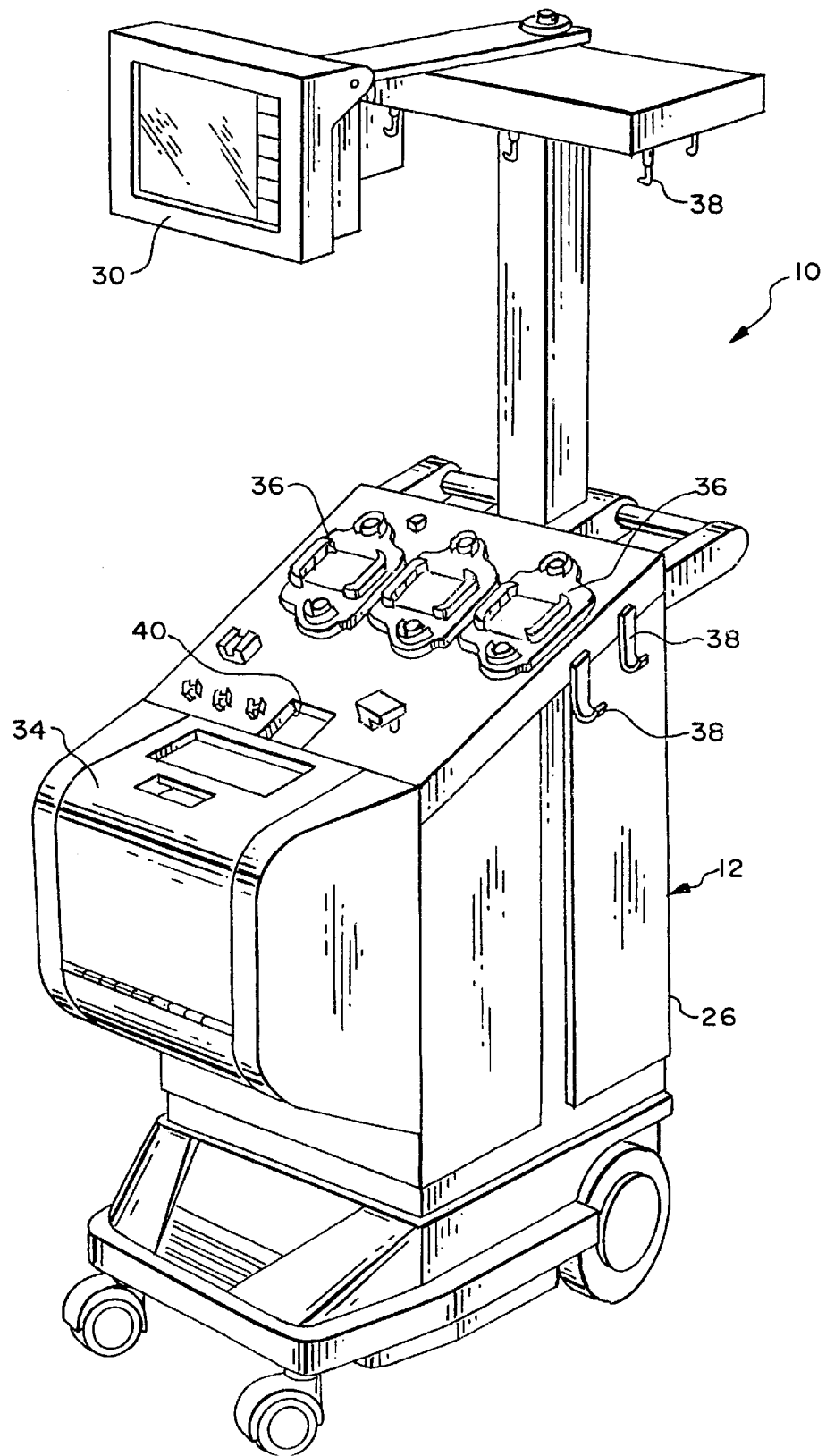
FIG. 1 is a perspective view of a blood processing apparatus embodying various features of the invention.
Figure 2:
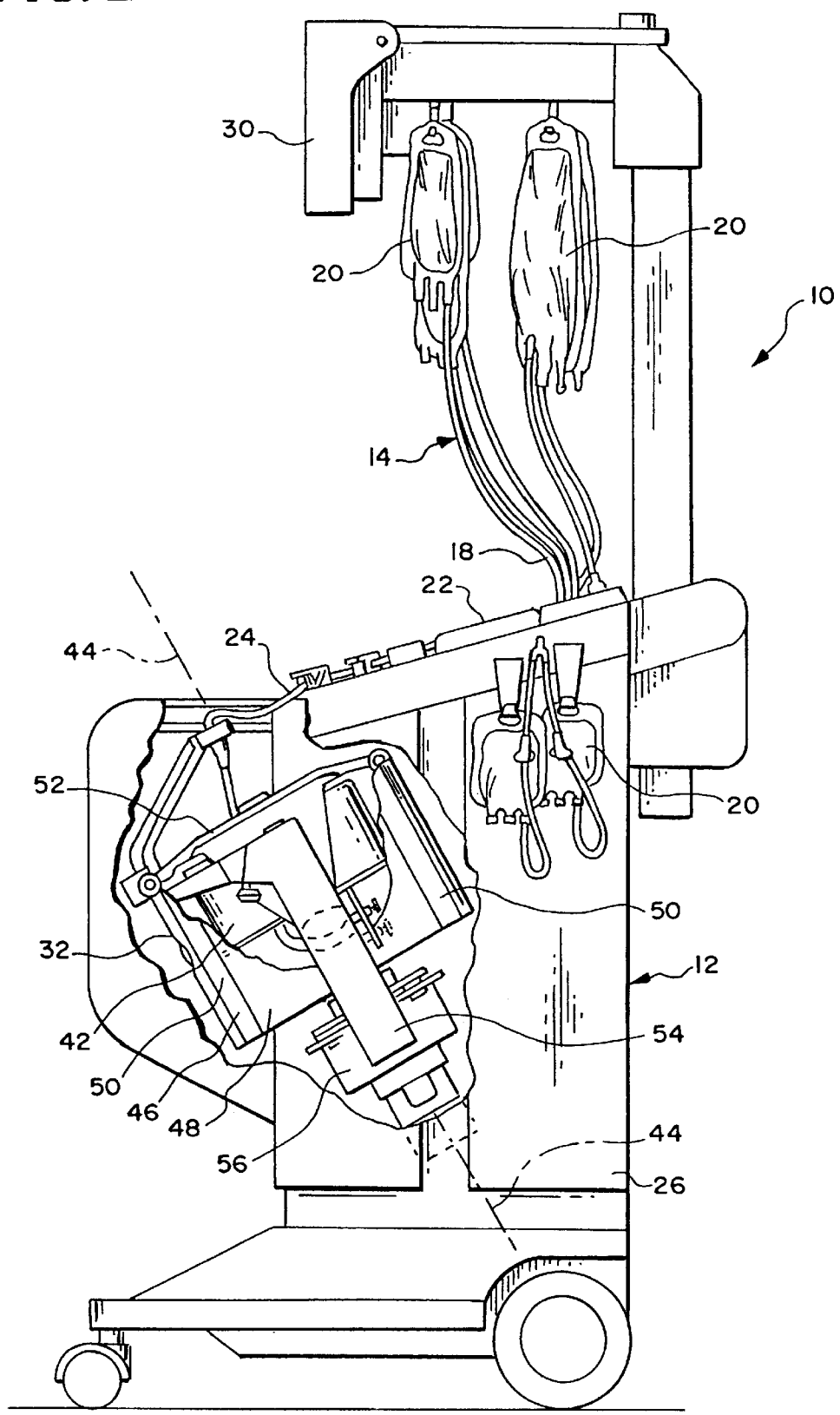
FIG. 2 is a side elevation view, partially in section, of the blood processing apparatus shown in FIG. 1.

FIGS. 1 and 2 show a blood processing apparatus 10. The blood processing apparatus 10 is of the type shown and described in U.S. Pat. No. 5,551,942, the specification of which is incorporated by reference herein. The apparatus 10 can be used to collect various blood constituents from a donor while returning uncollected constituents back to the donor. The apparatus 10 can also be used to process other suspensions of biological cellular materials.

The blood processing apparatus 10 includes a centrifuge assembly 12 and a fluid processing assembly 14 (FIG. 2) used in association with the centrifuge assembly 12. The centrifuge assembly 12 is a durable equipment item capable of long term, maintenance free use. The fluid processing assembly 14 is a single use, disposable item loaded on the centrifuge assembly 12 at the time of use. After a processing procedure has been completed, the operator removes the fluid processing assembly 14 from the centrifuge assembly 12 and discards it.

The fluid processing assembly 14 includes a processing chamber 16 (FIG.3) In use, the centrifuge assembly 12 rotates the processing chamber 16 to centrifugally separate blood components. Whole blood is conveyed to the processing chamber 16, and separated blood components are conveyed from the processing chamber 16, through a plurality of flexible tubes that form part of a fluid circuit 18. The fluid circuit 18 further includes a plurality of containers 20 that fit on hangers over the centrifuge assembly 12 and that dispense and receive liquids during processing. A plurality of in line cassettes 22 that operate in association with valve and pump stations on the centrifuge assembly 12, function to direct liquid flow among multiple liquid sources and destinations during a blood processing procedure. A portion of the tubes interconnecting the processing chamber 16, the containers 20 and the cassettes 22 are bundled together to form a flexible umbilicus 24.

The fluid circuit 18 preconnects the processing chamber 16, the containers 20 and the cassettes 22. The fluid processing assembly 14 thereby forms an integral, sterile unit.

As illustrated, the centrifuge assembly 12 includes a wheeled cabinet 26 that can be easily rolled from place to place. A user actuable processing controller 30 is provided which enables the operator to control various aspects of the blood processing procedure. A centrifuge 32 is provided behind a fold open door 34 that can be pulled open at the front of the cabinet 26. A plurality of valve and pump stations 36 are provided on the top face of the cabinet for receiving and controlling the various in line cassettes 22. A plurality of hooks or hangers 38 are provided on the cabinet 26 for suspending the various containers 20.

In use, the fold open door 34 is opened and the processing chamber 16 of the fluid processing assembly 14 is mounted in the centrifuge 32. The umbilicus 24 is threaded through the centrifuge 32 and out through an opening 40 in the upper panel of the cabinet 26. The in line cassettes 22 are snapped into respective ones of the valve and pump stations 36, and the containers 20 are hung from the appropriate hangers 38. After appropriate connections are made to the donor using known intravenous techniques, the operator enters appropriate commands on the processing controller to begin the processing procedure.

Figure 3:
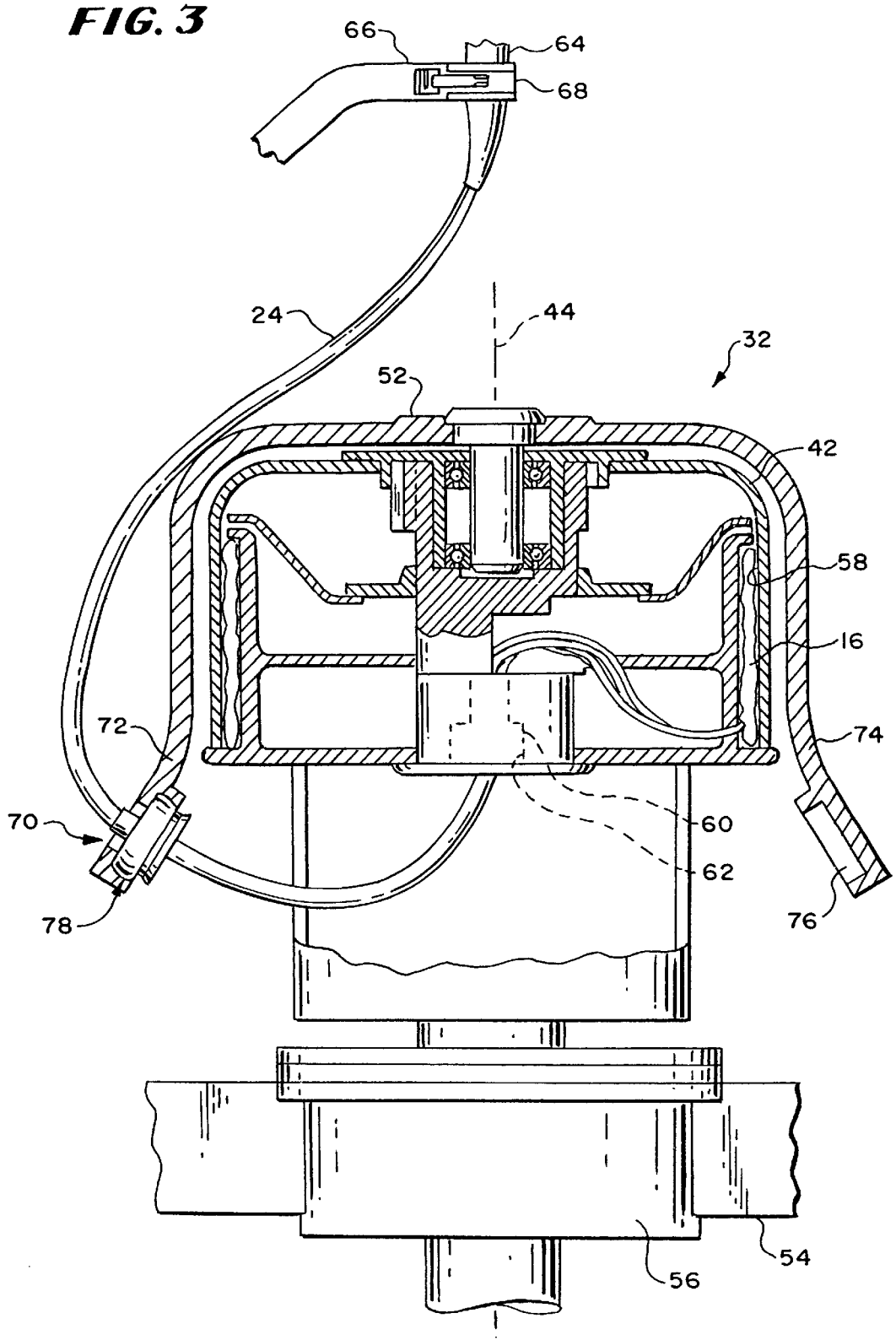
FIG. 3 is a side view, partially in section, of a centrifuge included in the blood processing apparatus of FIG. 1 showing the centrifuge in combination with a fluid processing assembly having an umbilicus supported at its midpoint by a wing plate and an umbilicus gimbal embodying various features of the invention.

Referring in particular to FIGS. 2 and 3, the centrifuge 32 includes a chamber assembly 42 that is supported for rotation around an axis of centrifugation 44. The centrifuge further includes a centrifuge yoke assembly 46 that includes a yoke base 48, a pair of upstanding yoke arms 50, and a yoke cross member 52 mounted between the arms 50. The yoke base 48 is rotatably supported on a stationary platform 54 that carries the rotating mass of the centrifuge 32. The yoke base 48 is also supported for rotation around the axis of centrifugation independently of the chamber assembly 42. An electric drive 56 rotates the yoke assembly 46 relative to the stationary platform 54 around the axis of centrifugation 44. The chamber assembly 42 is free to rotate around the axis of centrifugation 44 at a rotational speed that is different from the rotational speed of the yoke assembly 46.

Referring further to FIG. 3, the chamber assembly 42 defines an annular chamber 58, centered around the axis of centrifugation 44, for receiving the processing chamber 16 of the fluid processing apparatus 14. The umbilicus 24, through which fluids are introduced into and withdrawn from the processing chamber 16, extends through the lower center of the chamber assembly 42 in alignment with the axis of centrifugation 44. A lower support block 60 integrally molded or otherwise mounted onto the umbilicus 24, is received in a lowermost umbilicus mount 62 located at the lower center of the chamber assembly 42. The lower support block 60 and umbilicus mount 62 function to transfer torque between the umbilicus 24 and chamber assembly 42 so that the chamber assembly 42 rotates around the axis of centrifugation in response to twisting of the umbilicus 24 around its axis.

The other end of the umbilicus 24 is supported by means of an upper support block 64 that is removably received in an upper umbilicus mount 66 positioned over the centrifuge chamber assembly 42 substantially in alignment with the axis of centrifugation 44. An over center clamp 68 at the end of the upper umbilicus mount 66 clamps onto the upper support block 64 to hold the adjacent segment of the umbilicus 24 rotationally stationary and in collinear alignment with the axis of centrifugation 44. The upper support block 64 is preferably integrally molded or otherwise securely joined with the umbilicus 24.

As further illustrated in FIG. 3, the portion of the umbilicus 24 between the upper support block 64 and the lower support block 60 is supported by a middle umbilicus mount 70 that is carried at the lower end of a wing plate 72 extending outwardly and downwardly from the yoke cross member 52. As the electric drive 56 rotates the centrifuge yoke assembly 46 around the axis of centrifugation 44, the wing plate 72 and middle umbilicus mount 70 pull the middle portion of the umbilicus 24 around the axis of centrifugation 44 as well. As the umbilicus is so moved, a twisting action is imparted to the umbilicus 24 around its own axis. The middle portion of the umbilicus 24 is free to rotate around its axis relative to the wing plate 72 as the yoke assembly 46 is turned. The umbilicus is thus free to "untwist" against the twisting motion imparted by the rotating yoke assembly 46. As it untwists in this manner, the umbilicus 24 spins the centrifuge chamber assembly 42 around the axis of centrifugation 44.

To maintain balance as the yoke assembly 46 turns, an additional wing plate 74 extends from the yoke cross member 52 diametrically opposite the wing plate 72. A counterweight 76 sufficient to balance the mass of the middle umbilicus mount 70 and umbilicus 24 is carried on the lower end of the additional wing plate 74.

In accordance with one aspect of the invention, the middle portion of the umbilicus 24 is supported on the wing plate 72 by means of an umbilicus gimbal assembly 78 having a bearing retainer. Referring to FIGS. 3, 4 and 5, the manner in which the middle portion of the umbilicus 24 is supported and carried by the wing plate 72 is shown in detail.

As illustrated (See FIG. 3), a bearing assembly 80 is located on the umbilicus between the upper and lower support blocks 64 and 60. As FIG. 4 shows, the bearing assembly 80 includes an inner race 82 in the form of a collar that slips over the umbilicus 24 and is held in place by a retaining clip 84. The inner race includes a slotted forward flange portion 86 that is squeezed against the umbilicus under the clamping force of the clip 84, and further includes a rear race portion 88 that encircles the umbilicus 24 and defines a raceway for a plurality of balls 90.

To further secure the bearing assembly 80 to the umbilicus 24, various adhesives can be used. In the illustrated embodiment, the umbilicus 24 is formed from extruded polyester elastomer such as HYTREL®4 or HYTREL®6 plastic (DuPont). In this arrangement, polyurethane adhesives can be used, possibly including polyurethane in cyclohexane, as they bond well to material of the umbilicus 24 through beta-bonding. Five percent (5%) polyurethane in cyclohexane has shown to work well, but other adhesives suitable for bonding to HYTREL® could be used. The inner surface of the collar and/or the outer surface of the umbilicus 24 can be roughened to heighten adhesiveness. The adhesive 83 can be used by itself or in combination with the retainer clip 84.

The balls 90, which are preferably formed of a durable metal such as stainless steel, are confined between the inner race 82 and an outer race 92 having a generally annular form as indicated. A cage 94 between the rear race portion 88 of the inner race 82 and the outer race 92 keeps the balls separated and regularly spaced around the inner and outer races 82, 92. The bearing assembly 80 permits the umbilicus to rotate with very little friction relative to the outer race 92, while the adhesive 83, the clip 84 (if used), and the forward portion 86 of the inner race 82 resist axial movement of the bearing assembly relative to the umbilicus 24.

The inner race 82, and the outer race 92 and the cage 94 can be constructed with a wide range of materials. Several material characteristics are desired, including high formability with minimal shrinkage, greater dimensional accuracy and endurance, high rigidity and mechanical strength, high heat stability, and very low electrical conductivity to minimize the potential for static energy build up.

In order to maintain the necessary very close tolerances between the bearing and the gimbal, a bearing that resists dimensional changes with changing temperature, pressure and humidity conditions is desirable. It is also desirable to minimize any cage deflection and cage wear against the outer race of the bearing assembly. In addition, it is desirable to reduce any noise that the bearing may cause at high operating speeds.

The inner race 82, and the outer race 92 and the cage 94 can be constructed with reinforced polyesters. Several reinforced polyesters have the desired mechanical characteristics, and would perform suitably. Within the family of reinforced polyesters, thermoplastic crystalline polymers may perform particularly well due to their high formability with minimal shrinkage, greater dimensional accuracy and endurance, high rigidity and mechanical strength, high heat stability, and very low electrical conductivity to minimize the potential for static energy build up during rotation.

Figure 9:
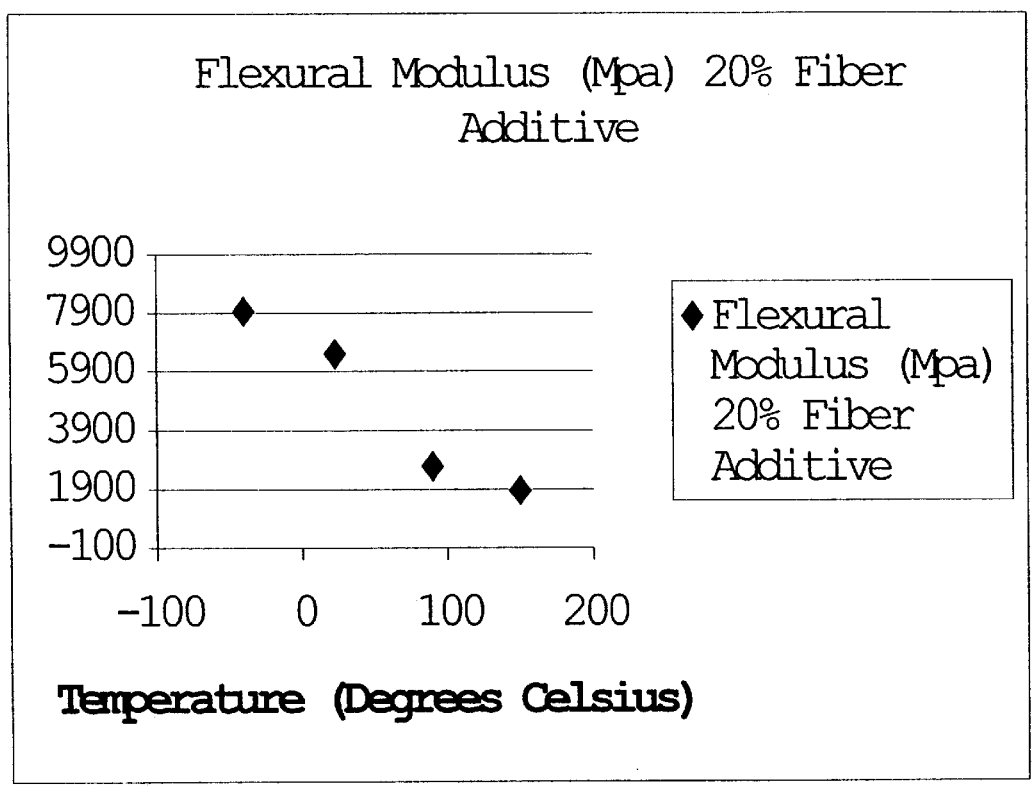
FIG. 9 is a chart showing the relation between temperature and flexural modulus for Rynite® thermoplastic polyester (DuPont).

FIG. 9 shows for Rynite® thermoplastic polyester (DuPont) how flexural modulus decreases with increasing temperature. Increased temperature would be expected at high rotational speeds because of friction.

Preferably, the inner race 82, and the outer race 92 and the cage 94 are machined from high molecular weight thermoplastic/thermoset materials rather than injection molded from thermoplastic materials. By machining rather than molding these parts, the parts can be held to tighter dimensional tolerances (e.g., 0.001") than is practically and economically achievable using injection molding techniques. Thermoplastic polyester resins are noted for their excellent flow characteristics in thin wall applications, close molding tolerances, and high productivity from multicavity molds In the illustrated embodiment, the cage 94 is constructed of the thermoplastic crystalline polymer polybutylene Terephthalate (PBT). Preferably, the cage 94 material includes an additive to raise the flexural modulus and heat resistance, and provide increased lubricity.

To demonstrate the effects of additive inclusion, the following Table 1 and Table 2 show that a 10% increase in additive content can lead to greater than a 20% increase in flexural modulus. For Rynite® thermoplastic polyester (DuPont) the following relation between flexural modulus was shown for 20% and 30% fiber additive content:

TABLE 1

| Temperature (° C.) | Flexural Modulus (Mpa) 20% Fiber Additive | Flexural Modulus (Mpa) 30% Fiber Additive |
| --- | --- | --- |
| −40 | 7950 | 10300 |
| 23 | 6480 | 8960 |
| 90 | 2690 | 3580 |
| 150 | 1870 | 2690 |

For RTP Company polybutylene terephthalate, the following results demonstrated the effects of carbon filler:

TABLE 2

| Carbon Filler Content | Unfilled | 10% | 20% | 30 | 40% |
|---|---|---|---|---|---|
| Flexural Strength (Mpa) | 83 | 172 | 220 | 193 | 262 |
| Flexural Modulus (psi E-9) | 400 | 950 | 1,700 | 2,500 | 3,000 |
| Tensile Strength (MPa) | 55 | 103 | 138 | 138 | 172 |
| Tensile Elongation (%) | 275 | 3.5 | 3 | 1.5 | 1.5 |

Many suitable PBT fillers are available, including for example: aramid fiber, glass beads, TEFLON®, molybdenum disulfide, silicon, PTFE, minerals such as mica, stainless steel, or nickel-coated carbon fiber. These fillers could work well in varying concentrations to produce the desired results, including ease in injection moldability, high stiffness, high flexural modulus, and low tensile elongation. However, with high flexural modulus and low tensile elongation, brittleness often complicates use, and could lead to cage cracking during use. Therefore, the preferred embodiments retain high stiffness and high flexural modulus, low tensile elongation percentages, while retaining a minimal level of ductility to avoid too brittle of a cage.

Preferably, the cage 94 is constructed of PBT with a carbon fiber additive, because carbon fiber shows similar strength characteristics to glass or other filler materials as shown in Tables 1 and 2, but carbon fiber adds greater lubricity than does the glass or other mineral fiber. Even more preferably, the PBT is filled with 5%–50% carbon fibers. Even more preferably, the PBT is filled with 10%–30% carbon fibers. Most preferably, the PBT is filled with 15% carbon fibers, based on weighing the above criteria of high flexural modulus, high formability with minimal shrinkage, greater dimensional accuracy and endurance, high rigidity and mechanical strength, high heat stability, and very low electrical conductivity to minimize the potential for static energy build up.

Alternatively, the cage material could be constructed with fillers comprising aramid fiber, TEFLON®, glass beads, molybdenum disulfide, silicon, PTFE, minerals such as mica, stainless steel, or nickel-coated carbon fiber, glass fiber filler, or mineral fiber filler, or a combination of glass and mineral fillings. The addition of glass fibers and other reinforcing materials can raise the heat resistance to over 200 degrees C. Although the glass fiber filler provides sufficient stiffness, it does not provide as much lubricity as the preferred carbon fiber additive.

The cage 94 is molded, preferably to within tolerances of 0.005"

Referring further to FIGS. 3, 4 and 5, the outer race 92 of the bearing assembly 80 is mounted onto the middle umbilicus mount 70 of the wing plate 72 by means of the umbilicus gimbal assembly 78. The umbilicus gimbal assembly 78 comprises a gimbal 96 that is received in the middle umbilicus mount 70 and a bearing retainer 98 that is received in the gimbal 96. The middle umbilicus mount 70 comprises a circular opening 100 formed in the lowermost end of the wing plate 72. Preferably, the sidewall of the circular opening is inwardly or concavely shaped as shown, thereby giving the opening a generally spherical shape. A gap 102 is formed in the end of the wing plate 72 and opens into the circular opening to enable the umbilicus 24 and bearing assembly 80 to be inserted into the middle umbilicus mount 70 from the side. A pair of orthogonally oriented pivot pins 104 extend from the side walls of the wing plate 72 into the interior of the circular opening 100.

The gimbal 96 comprises a generally annularly-shaped member having a ring-like form. The outer sidewalls 106 of the gimbal 96 are outwardly rounded or convex as shown, thereby giving the gimbal 96 a generally spherical shape that matches the shape of the opening 100. A pair of elongate transverse slots 108 are formed through the sidewalls 106 and are positioned and dimensioned to receive the pivot pins 104 when the gimbal is received in the circular opening 100. The rounded sidewalls 106 of the gimbal 96, together with the elongate slots 108 and pivot pins 104 received therein, enable the gimbal 96 to pivot within the circular opening 100 around two orthogonal axes. A "gimbal" action is thus provided. A gap 110 is formed through the side of the gimbal 96 to permit entry of the umbilicus 24. The gimbal 96 is preferably formed of a durable, rigid, low-friction plastic such as Delrin.

The bearing retainer 98 comprises a generally cylindrical ring-like structure and is preferably formed of a resilient, durable, springy material such as stainless steel. The bearing retainer includes a substantially constant diameter middle segment 112, a flared outer end 114 at one end of the middle segment 112, and a reduced diameter inner end 116 at the other end of the middle segment 112. A gap 118 opening through the side of the bearing retainer permits entry of the umbilicus 24.

In accordance with one aspect of the invention, the bearing retainer 98 and the gimbal 96 are configured so that the bearing retainer is loosely received in the gimbal 96, and yet positively retained in the gimbal 96. To this end, the inner end 116 of the bearing retainer 98 includes a pair of retaining wings or lugs 120, each extending partially around the periphery of the rear end of the middle segment 112. Referring to FIG. 5, each wing 120 defines a substantially square sectioned channel having a bottom wall 122, an outer side wall 124 and an inner side wall 126. The bottom side walls 122 of the wings 120 effectively define a region of reduced diameter as compared with the diameter of the middle section 112 of the bearing retainer 98. As further illustrated in FIG. 5, one end of the gimbal 96 is provided with an integrally formed rim or ledge 128 that is positioned and dimensioned to be received in the channels formed by the wings 120. A pair of clearance slots 130 are formed in the outer end wall of the gimbal 96 to provide clearance for the outer side walls 124 of the wings. The ends 132 of the clearance slots provide abutment surfaces that engage the ends of the side walls 124 to limit rotational movement of the bearing retainer 98 relative to the gimbal 96 when the bearing retainer 98 is received in the gimbal 96.

In further accordance with the invention, the bearing retainer is configured to receive and accommodate umbilicus bearings having outer races 92 of differing diameters. At the same time, gimbal 96 is configured to remain movable within the opening 100 of the wing plate 72 without binding. This is accomplished by providing lateral clearance between the outer side walls of the bearing retainer 98 and the inner side walls of the gimbal 96. Referring to FIG. 5., it will be seen that a gap or space exists between the inner end wall of the gimbal rim 128 and the bottom wall 122 of the bearing retainer wing 120. Similar clearance is provided between the outer side wall 124 of the wing 122 and the radially outlying adjacent portion of the gimbal 96. Finally, similar clearance is provided between the interior side wall 134 of the gimbal 96 and the exterior sidewall of the bearing retainer 98. The clearances thus provided between the bearing retainer 98 and the gimbal 96 enable the bearing retainer 98 to expand to accommodate larger bearing races 92 without interfering with or expanding the size of the gimbal 96. Similarly, the bearing retainer 98 can close down to accommodate outer races 92 of smaller size without compromising the retaining function provided through the interaction of the gimbal ridge 128 with the retaining wings 120. In this manner, the bearing retainer 98 can accommodate bearings of different sizes without affecting the ability of the gimbal 96 to pivot within the opening 100 of the wing plate 72.

To further avoid possible binding of the gimbal 96 and bearing retainer 98 within the opening 100, clearance slots 136 can be formed in the outer side wall of the middle portion 112 of the bearing retainer 98 under the slots 108 of the gimbal 96 to provide clearance for the ends of the pivot pins 104.

As further illustrated in FIG. 5, the middle portion 112 of the bearing retainer 98 is elongated to project well past the sides of the wing plate 72. In addition, the middle portion 112 terminates in the flared outer section 114. These attributes enable the gimbal 96 and bearing retainer 98 carried therewith to pivot around the pivot pins 104 over a wide range before the bearing retainer 98 hits the wing plate 72 and thereby limits further travel.

In use, the bearing retainer 98 is snapped into the gimbal 96 with the retaining wings 120 received in the retaining slots 130. The gimbal 96 and bearing retainer 98 are then inserted into the opening 100 of the wing plate 72 with the pivot pins entering the respective slots 108. The gimbal 96 should, at this point, be freely pivotable relative to the wing plate 72 and the slots 102, 110 and 118 in the wing plate 72, the gimbal 96 and the bearing retainer 98 should all line up. The umbilicus 24 can then be inserted sideways through the slots 102, 110 and 118, and the outer race 92 of the umbilicus bearing assembly 80 is pressed axially into the bearing retainer 98 from the flared end 114. The bearing retainer 98 should expand as necessary to receive the outer race 92 and should firmly grip the outer race 92 with a tight frictional fit to resist withdrawing movement of the bearing assembly 80. At the same time, such expansion of the bearing retainer 98 should be accommodated by the radial clearance between the bearing retainer 98 and the gimbal 96, and the outer dimension of the gimbal 96 should not change. Accordingly, the gimbal 96, and the bearing retainer 98 and bearing assembly 80 mounted therein, should remain freely pivotable relative to the wing plate 72. In this manner, the umbilicus gimbal assembly 78 provides for positive and reliable retention of umbilicus bearings of differing outer dimension without compromising the effectiveness of the gimballing action provided by the assembly 78.

Figure 6:
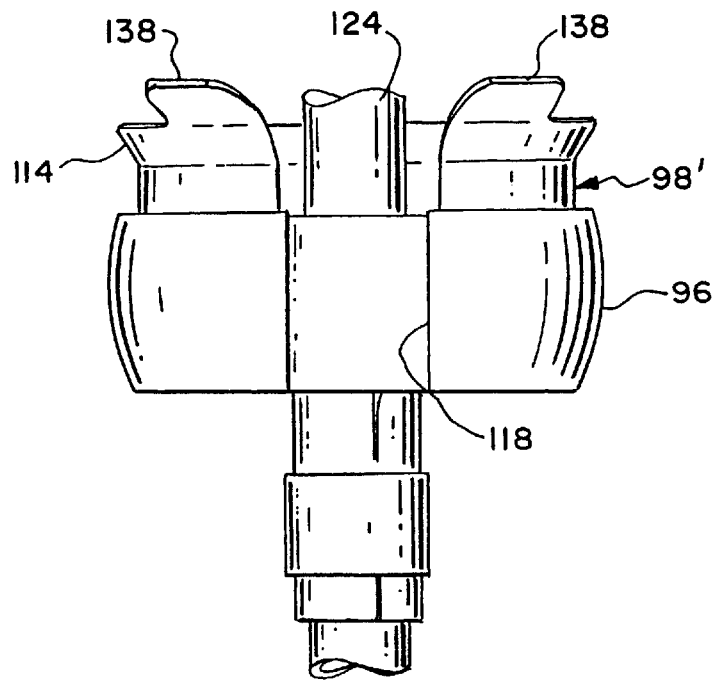
FIG. 6 is front elevation view of an alternate embodiment umbilicus gimbal having alternate bearing retainer configuration intended to facilitate removal of the umbilicus bearing from the bearing retainer.
Figure 7:
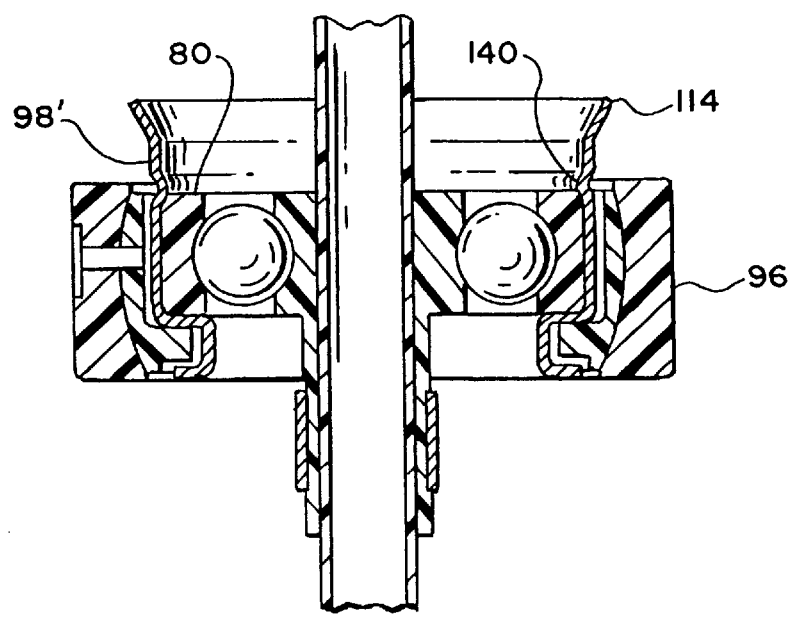
FIG. 7 is a sectional view of the alternate embodiment shown in FIG. 6.
Figure 8:
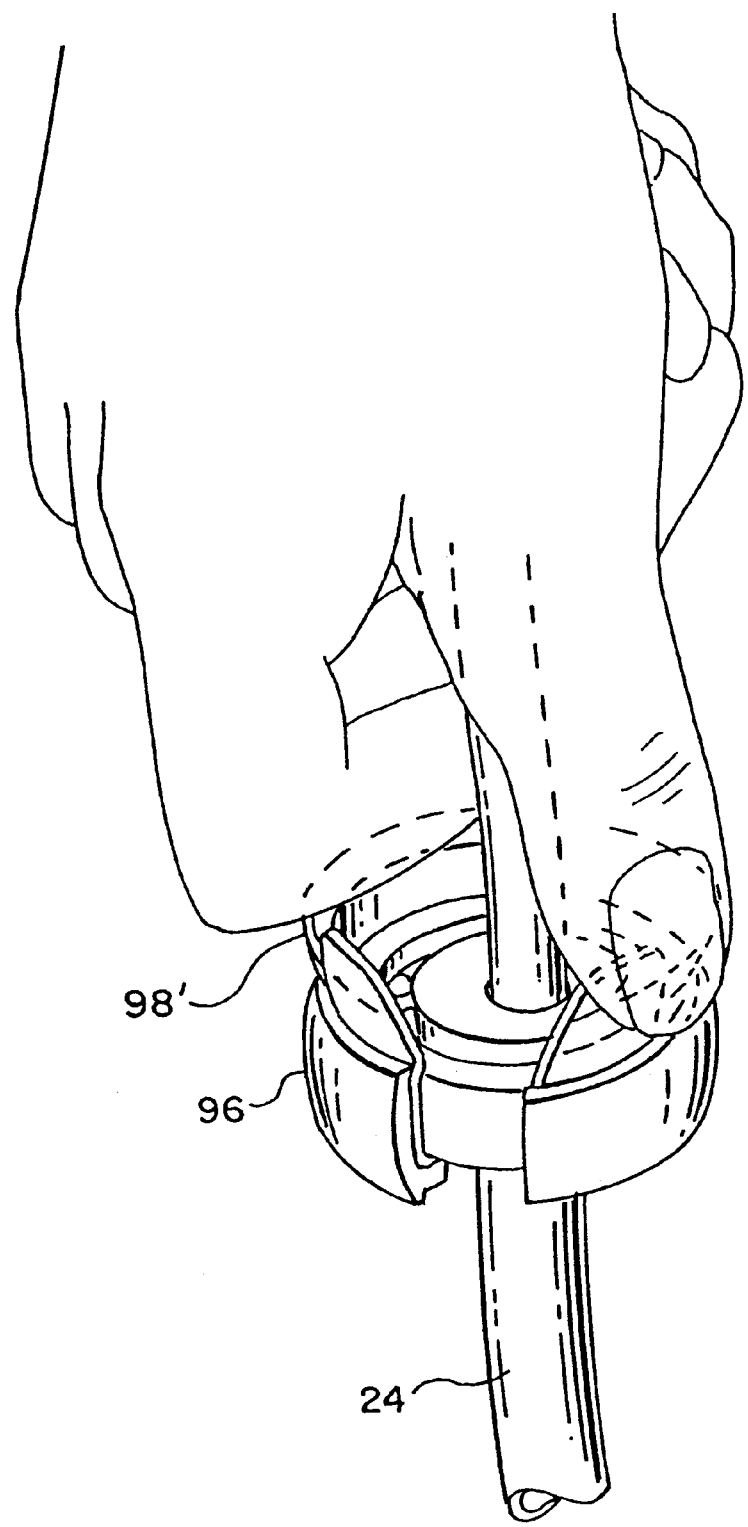
FIG. 8 is a perspective view of the alternate embodiment shown in FIGS. 6 and 7 useful in understanding the use thereof.

An alternate embodiment bearing retainer 98' is shown in FIGS. 6, 7 and 8. In this embodiment, a pair of outwardly projecting thumb tabs 138 are integrally formed in the flared outer end 114 of the bearing retainer 98' adjacent the gap 118. In addition, an inwardly projecting lip or ridge 140 (FIG. 7) is formed at the juncture of the flared outer end 114 and the middle segment 112.

The ridge 140 provides an audible or tactile "click" when the bearing assembly 80 is fully and properly seated in the bearing retainer 98'. In addition, the ridge 140 resists withdrawing movement of the bearing assembly 80 once seated and helps retain the bearing assembly 80 within the bearing retainer 98'.

It will be appreciated that the thumb tabs 138 and the ridge 140 can be included each separately or in combination with each other as desired.

The thumb tabs 138 facilitate removal of the bearing assembly 80 from the bearing retainer 98' following a processing procedure. By wrapping four fingers of the hand around the downstream portion of the umbilicus and thereafter pressing down on one of the tabs 138 with the thumb as shown in FIG. 8, the bearing assembly 80 is forced upwardly out of and away from the bearing retainer 98'.

We claim:

1. A fluid processing system including a fluid processing chamber that, in use, rotates about an axis, an umbilicus coupled to the fluid processing chamber, a bearing coupled to the umbilicus, a bearing support rotatable about the fluid processing chamber in engagement with the bearing to impart a twisting motion to the umbilicus to rotate the fluid processing chamber about the axis of rotation, the bearing support having a gimbal mounted on the bearing support to retain and support the bearing during rotation, the bearing comprising:

an inner annular body, an outer annular body extending about the inner annular body, a bearing surface comprising an array of ball bearings between the inner annular body and the outer annular body, supporting the outer annular body for rotation about the inner annular body, a cage supporting the bearing surface during rotation of the outer annular body about the inner annular body, the cage including a material that has a flexural modulus and an additive material that increases the flexural modulus to resist deformation during rotation.

2. A fluid processing system according to claim 1, wherein the umbilicus body includes a proximal region and a distal region, and wherein the inner annular body of the bearing is secured to the umbilicus body between the proximal region of the umbilicus and the distal region of the umbilicus.

3. A fluid processing system according to claim 2, wherein the inner annular body includes a collar, and wherein a clip fastens the collar to the umbilicus, thereby securing the bearing to the umbilicus.

4. A fluid processing system according to claim 1, wherein adhesive fastens the inner annular body to the umbilicus body.

5. A fluid processing system according to claim 4, wherein at least one of the umbilicus body and the inner annular body is roughened where adhesive fastens the inner annular body to the umbilicus body.

6. A fluid processing system according to claim 1, wherein the cage material is reinforced polyester.

7. A fluid processing system according to claim 6, wherein the reinforced polyester is thermoplastic crystalline polymer.

8. A fluid processing system according to claim 7, wherein the thermoplastic crystalline polymer is polybutylene terephthalate.

9. A fluid processing system according to claim 1, wherein the additive material includes a fiber additive.

10. A fluid processing system according to claim 9, wherein the fiber additive is carbon.

11. A fluid processing system according to claim 9, wherein the fiber additive is glass fiber or mineral fiber or glass and mineral fiber.

12. A fluid processing system according to claim 1, wherein the cage supports the array of balls in a circumferentially spaced apart relationship.

13. A blood processing system including a blood processing chamber that, in use, rotates about an axis, an umbilicus coupled to the blood processing chamber, a bearing coupled to the umbilicus, a bearing support rotatable about the blood processing chamber in engagement with the bearing to impart a twisting motion to the umbilicus to rotate the blood processing chamber about the axis of rotation, the bearing support having a gimbal mounted on the bearing support to retain and support the bearing during rotation, the bearing comprising:

an inner annular body, an outer annular body extending about the inner annular body, a bearing surface comprising an array of ball bearings between the inner annular body and the outer annular body, supporting the outer annular body for rotation about the inner annular body, a cage supporting the bearing surface during rotation of the outer annular body about the inner annular body, the cage including a material that has a flexural modulus and an additive that increases the flexural modulus to resist deformation during rotation.

14. A blood processing system according to claim 13, wherein the umbilicus body includes a proximal region and a distal region, and wherein the inner annular body of the bearing is secured to the umbilicus body between the proximal region of the umbilicus and the distal region of the umbilicus.

15. A blood processing system according to claim 14, wherein the inner annular body includes a collar, and wherein a clip fastens the collar to the umbilicus, thereby securing the bearing to the umbilicus.

16. A blood processing system according to claim 13, wherein adhesive fastens the inner annular body to the umbilicus body.

17. A blood processing system according to claim 16, wherein at least one of the umbilicus body and the inner annular body is roughened where adhesive fastens the inner annular body to the umbilicus body.

18. A blood processing system according to claim 13, wherein the cage material is reinforced polyester.

19. A blood processing system according to claim 18, wherein the reinforced polyester is thermoplastic crystalline polymer.

20. A blood processing system according to claim 19, wherein the thermoplastic crystalline polymer is polybutylene terephthalate.

21. A blood processing system according to claim 13, wherein the additive material includes a fiber additive.

22. A blood processing system according to claim 21, wherein the fiber additive is carbon.

23. A blood processing system according to claim 21, wherein the fiber additive is glass fiber or mineral fiber or glass and mineral fiber.

24. A blood processing system according to claim 13, wherein the cage supports the array of balls in a circumferentially spaced apart relationship.

* * * * *